United States Patent [19]

Coffey et al.

[11] Patent Number: 4,493,775

[45] Date of Patent: Jan. 15, 1985

[54] METHOD AND COMPOSITION FOR CORROSION

[75] Inventors: M. Dewayne Coffey, South Jenks; Mary Y. Kelly; Weldon C. Kennedy, Jr., both of Tulsa, all of Okla.

[73] Assignee: The Dow Chemical Company, Midland, Mich.

[21] Appl. No.: 537,887

[22] Filed: Sep. 30, 1983

[51] Int. Cl.³ .............................................. C09K 3/00
[52] U.S. Cl. ............................. 252/8.55 C; 252/148; 166/244 C
[58] Field of Search ............ 252/392, 8.55 C, 8.55 E, 252/394, 390, 148; 422/12, 16; 166/244 C

[56] References Cited

U.S. PATENT DOCUMENTS

| | | | |
|---|---|---|---|
| 1,877,504 | 9/1932 | Grebe. | |
| 2,011,579 | 8/1935 | Heath et al. | 23/5 |
| 3,077,454 | 2/1963 | Monroe et al. | 252/148 |
| 3,233,672 | 2/1966 | Carpenter | 166/42 |
| 3,236,305 | 2/1966 | Parks | 166/42 |
| 3,248,334 | 4/1966 | Monroe et al. | 252/151 |
| 3,353,604 | 11/1967 | Gibson et al. | 166/42 |
| 3,380,529 | 4/1968 | Hendrickson | 166/33 |
| 3,404,094 | 10/1968 | Keeney | 252/8.55 C |
| 3,434,971 | 3/1969 | Atkins | 252/8.55 |
| 3,773,465 | 11/1973 | Keeney | 21/2.7 R |
| 3,779,915 | 12/1973 | Kucera | 252/8.55 C |
| 3,794,523 | 2/1974 | Thompson | 134/3 |
| 3,816,322 | 6/1974 | Griffin et al. | 252/147 |
| 3,932,296 | 1/1976 | Byth | 252/148 |
| 3,934,651 | 1/1976 | Nierode et al. | 166/282 |
| 3,954,636 | 5/1976 | Crowe et al. | 252/8.55 C |
| 3,962,101 | 6/1976 | Crowe | 252/8.55 C |
| 3,962,102 | 6/1976 | Crowe | 252/8.55 C |
| 4,071,746 | 1/1978 | Quinlan | 252/392 |
| 4,100,099 | 7/1978 | Asperger et al. | 252/189 |
| 4,100,100 | 7/1978 | Clouse et al. | 252/189 |
| 4,102,804 | 7/1978 | Clouse et al. | 252/189 |
| 4,120,654 | 10/1978 | Quinlan et al. | 422/16 |
| 4,140,640 | 2/1979 | Scherbel | 252/8.55 C |
| 4,151,878 | 5/1979 | Thomas | 166/307 |
| 4,210,552 | 7/1980 | Frenier et al. | 252/151 |
| 4,220,550 | 9/1980 | Frenier et al. | 252/180 |
| 4,320,014 | 3/1982 | Vivian | 252/8.55 C |
| 4,343,720 | 8/1982 | Quinlan | 252/8.55 C |
| 4,387,042 | 6/1983 | Hort et al. | 252/8.55 C |

*Primary Examiner*—Ben R. Padgett
*Assistant Examiner*—T. J. Wallen
*Attorney, Agent, or Firm*—Paul D. Hayhurst

[57] ABSTRACT

An improved composition for inhibiting the corrosion of ferrous metals in acidic environments, especially in the presence of $H_2S$.

21 Claims, No Drawings

METHOD AND COMPOSITION FOR CORROSION

BACKGROUND OF THE INVENTION

The present invention relates to a new class of corrosion inhibitors. More specifically, the invention concerns novel compositions which reduce the attack of aqueous solutions of acids on metals of construction.

Many compositions have been proposed as corrosion inhibitors for ferrous metals in oil field applications, such as acidizing. Many of said compositions exhibit acceptable rates of inhibition under limited circumstances. See, e.g., the teaching of U.S. Pat. No. 3,077,454, which describes Mannich condensation products as corrosion inhibitors. However, it would be desirable to have a corrosion inhibitor composition which is useful in a broader number of situations. For example, the presence of $H_2S$ in wells (sour wells) leads to unique corrosion problems in addition to the corrosion problems presented by the acidizing acid. Additionally, in certain applications it is necessary to employ special additives, such as demulsifiers or wetting agents, which often are not highly compatible with the corrosion inhibitor being employed, thereby leading to reduced corrosion protection. Thus, it would be desirable to have a corrosion inhibitor composition which could inhibit acid corrosion of ferrous metals even in the presence of $H_2S$, and which would be highly compatible with a large number of special additives.

SUMMARY OF THE INVENTION

In one aspect, the present invention is such a corrosion inhibitor composition comprising:
(A) The product of the reaction of
 (1) cyclohexylamine or an inertly-substituted derivative thereof, a salt of either of these, or mixtures thereof, with
 (2) per mole of component (1), greater than about 10 moles of formaldehyde or an amount of paraformaldehyde which is sufficient to release greater than about 10 moles of formaldehyde, or a mixture thereof, and
 (3) acetophenone, an inertly-substituted derivative thereof, or a mixture thereof, in an amount which is from about 3 moles per mole of component (A) (1) to an amount which is about equimolar to component (A) (2), and
 (4) from zero to about 10 weight percent, based on the sum of the weights of components (A) (1), (A) (2) and (A) (3), of at least one aliphatic carboxylic acid having from 1 to about 20 carbon atoms; and
(B) a combination of
 (1) at least one acetylenic alcohol, and
 (2) additional, unreacted formaldehyde.

In another aspect, the present invention is an acid composition for treating a subterranean formation penetrated by a wellbore, comprising an aqueous solution of an acid and, in an amount which is effective to inhibit metal corrosion, the corrosion inhibitor composition of the present invention described hereinabove.

In yet another aspect, the present invention is an improved method of treating a subterranean formation penetrated by a wellbore by injecting an acid through the wellbore and into said formation, the improvement comprising employing an acid comprising the corrosion inhibitor composition of the present invention described hereinabove. This method is especially effective in acidizing oil or gas wells in the presence of $H_2S$, which may be formed in situ.

Surprisingly, the corrosion inhibitor composition of the present invention exhibits good compatibility with a large number of known additives over a wide range of conditions, and is especially effective in the presence of $H_2S$.

DETAILED DESCRIPTION OF THE INVENTION

The corrosion inhibitor of the present invention includes a reaction mixture along with a number of additional components. The reaction mixture is prepared by reacting a formaldehyde component, an acetophenone component, a cyclohexylamine component and, optionally, an aliphatic carboxylic acid component.

The cyclohexylamine component of the reaction mixture can be cyclohexylamine, which is preferred, or an inertly-substituted cyclohexylamine derivative, such as 2-methyl cyclohexylamine or 2,4-dimethyl cyclohexylamine. This component can be in the form of the salt of cyclohexylamine or the salt of the inertly-substituted cyclohexylamine derivatives. Examples of such salts include the hydrochloride, the hydrobromide and the hydroiodide. Mixtures of cyclohexylamine components can be employed.

The formaldehyde component of the reaction mixture is formaldehyde, typically in aqueous solution, or paraformaldehyde, or a mixture thereof. Paraformaldehyde is preferred for convenience and safety-related reasons, as it is a solid at ambient temperatures. Advantageously, at least about 10 moles of formaldehyde are employed per mole of the cyclohexylamine component. When paraformaldehyde is employed, it is employed in an amount which is sufficient to produce in situ the required number of moles of formaldehyde. Preferably, from about 11 to about 15 moles of formaldehyde are employed per mole of cyclohexylamine component. Most preferably, from about 12 to about 13 moles of formaldehyde are employed per mole of cyclohexylamine component.

The acetophenone component of the reaction mixture is acetophenone, which is preferred, or an inertly-substituted derivative thereof, or a mixture thereof. Typically, the acetophenone component is employed in an amount which is from about 3 moles per mole of cyclohexylamine component up to an amount which is about equimolar to the formaldehyde component, preferably from about 4 to about 8 moles of acetophenone component are employed per mole of cyclohexylamine component. Most preferably, from about 5 to about 6 moles of acetophenone component are employed per mole of cyclohexylamine component.

The aliphatic carboxylic acid component of the reaction mixture is at least one aliphatic carboxylic acid having from 1 to about 20 carbon atoms. Examples of suitable carboxylic acids include rendered animal fat, octanoic acid, myristic acid, pelargonic acid, lauric acid, oleic acid and tall oil, which is preferred. Typically, the aliphatic carboxylic acid component is employed in an amount ranging from zero up to an amount which is about 10 weight percent of the sum of the weights of the acetophenone component, the cyclohexylamine component and the formaldehyde component. Preferably, the aliphatic carboxylic acid component is employed in an amount ranging from zero to about 2 weight percent, measured as described in the preceding sentence.

The reaction of the components of the reaction mixture can be conducted under any conditions at which the reaction of the components will proceed. Typically, a reaction temperature of from about 150° F. to about 250° F. is employed. The preferred temperature range is from about 200° F. to about 230° F. The reaction can be conducted at any convenient pressure. Preferably, the reaction is conducted at a pressure of from about 10 to about 60 psig. The reaction takes from about 1 to about 16 hours.

An acid catalyst may be employed to catalyze the reaction. If employed, the catalyst is employed in a catalytic amount. Typically, the acid is employed in an amount ranging from about 0 to about an equimolar amount of acid based upon the cyclohexylamine component of the reaction mixture. Suitable acid catalysts include mineral acids and strong organic acids, and are well-known in the art. The preferred acid catalyst is HCl. The acid may be employed as aqueous acid, which is preferred, or it may be employed as the acid salt of the cyclohexylamine component of the reaction mixture, such as, for example, as cyclohexylamine hydrochloride.

In addition to the reaction mixture described hereinbefore, the corrosion inhibitor composition includes additional components. The additional components fall into two categories; required and optional. An acetylenic alcohol and excess formaldehyde are the required additional components.

The acetylenic alcohol can be a mixture of acetylenic alcohols. Suitable acetylenic alcohols are those having from about 3 to about 10 carbon atoms, such as, for example, 1-propyn-3-ol, 1-butyn-3-ol, 1-pentyn-3-ol, 1-hexyn-3-ol, 1-heptyn-3-ol, 1-octyn-3-ol, 1-nonyn-3-ol, 1-decyn-3-ol, 1-octyn-4-ethyl-3-ol (ethyl octynol), which is preferred, and the like. Typically, from about 1 to about 30 volume percent of the acetylenic alcohol is employed, based on the volume of the final corrosion inhibitor composition. Preferably, from about 5 to about 15 volume percent is employed.

The excess formaldehyde is employed in an amount sufficient to produce a final corrosion inhibitor composition having at least about 4 weight percent free formaldehyde, based on the sum of the weight of the reaction mixture component and the required additional components. Preferably, an amount of excess formaldehyde is employed such that from about 5 to about 20 weight percent, calculated as described in the preceding sentence, free formaldehyde is present in the final product.

Desirable additional components include a $C_1$–$C_4$ alkanol and a surfactant. Mixtures of alkanols can be employed. Isopropanol is the preferred alkanol. Typically, the alkanol is employed in an amount which is from about 5 to about 50 volume percent of the corrosion inhibitor composition. Preferably, from about 10 to about 15 volume percent of the corrosion inhibitor composition is a $C_1$–$C_4$ alkanol.

Mixtures of surfactants can be employed. The surfactant must be capable of dispersing the hereinabove-described reaction product in aqueous acids. Nonionic surfactants are preferred. Typical nonionic surfactants include ethoxylated alkanols or ethoxylated alkyl phenols. Preferred nonionic surfactants include from about 5 to about 40 moles of ethylene oxide and alkyl phenol. The most preferred nonionic surfactants include adducts of from about 5 to about 15 moles of ethylene oxide and a $C_{10}$–$C_{12}$ alkanol. Typically, the surfactant is employed in an amount which will disperse the reaction product in the applicable aqueous acid. The surfactant preferably is employed in an amount which is from about 3 to about 25 volume percent, and most preferably from about 10 to about 15 volume percent based on the volume of the final corrosion inhibitor composition.

Optional additional components which are known in the art and which may be employed, depending upon the conditions at the well to be acidized, include demulsification agents, viscosifiers, comingled gases, e.g., $CO_2$ and nitrogen, water-wetting agents, iron control agents, and the like.

The inhibitor of the present invention substantially eliminates the attack of aqueous acids on ferrous metals. The inhibitor can be employed with combinations of acids or with individual acids. Suitable acids include strong or weak organic acids, such as hydroxyacetic, acetic, propionic, formic and the like, as well as mineral acids such as hydrofluoric, HCl/HF mixtures, hydrochloric, sulfuric, phosphoric, and the like. The inhibitor is especially effective in sour wells, where $H_2S$ corrosion is a potential problem. The $H_2S$ may be formed when the treating acid contacts a sulfur-containing mineral, such as FeS. Typically, the inhibitor is employed in an amount which is effective to inhibit metal corrosion. Preferably, from about 0.1 to about 2.0 volume percent of the inhibitor is employed in the acid, based on the total volume of the inhibited acid.

SPECIFIC EMBODIMENTS

The following examples and comparative experiments are illustrative of the present invention, but are not to be construed as limiting its scope.

EXAMPLE 1

The following materials are added to a sealed, glass-lined reaction vessel equipped with a stirring means, a condensing means, and a temperature controlling means:

| Component | Weight Percent | Moles |
| --- | --- | --- |
| acetophenone | 53.51 | 5.7 |
| paraformaldehyde | 29.4 | 12.6 |
| cyclohexylamine | 7.7 | 1.0 |
| tall oil | 1.0 | — |
| HCl | 8.39* | 0.9 |

*HCl (0.9 mole) is employed as 31.5 percent by weight aqueous HCl.

The materials are added to the vessel in any convenient order. The stirring means operates continuously during this example. Then the temperature is raised to 220° F. over a period of about 30 to 40 minutes, and the temperature is maintained at 220° F. for about 9 hours. The reaction mixture is allowed to cool, then a portion of it is used to prepare an inhibitor having the following composition:

| Component | volume percent |
| --- | --- |
| reaction mixture | 50 |
| ethyl octynol | 12.5 |
| formalin* | 10 |
| isopropanol | 12.5 |
| nonionic surfactant** | 15 |

*37.25 weight percent aqueous formaldehyde.
**The surfactant is the adduct of trimethyl nonyl alcohol with 6 moles of ethylene oxide, sold under the tradename Tergitol TMN-6 by Union Carbide.

General Corrosion Rate Determination Procedure

The corrosion rate determinations of the following examples are made according to the following procedure: a quarter segment of a one-inch-wide ring is cut from API N80 oil field tubing having an outside diameter of 2.375 inches, an inside diameter of 2 inches and a surface area of 4.34 square inches. The segment, or coupon, is weighed and placed in 100 ml of 15 weight percent aqueous HCl containing the inhibitor. The coupon is exposed for 24 hours at the designated temperature. At the end of this time, the coupon is reweighed and the corrosion rate is calculated from the weight loss.

In order to compare an uninhibited acid with the inhibited acids, the preceding General Procedure is run with uninhibited acid. However, the uninhibited acid acts so rapidly that it is expended before the end of the test. Therefore, a 0.5-hour test time is employed, and the corrosion rate of uninhibited acid is 5.3 pounds per square foot per day.

In the following table, a "G" indicates the particular value is that used in the General Procedure given hereinabove. In the following table, Inhibitor A is the formulation of Example 1; Inhibitor B is a commercially available Mannich condensation reaction product inhibitor formulation having no acetylenic alcohol; and Inhibitor C is the formulation of Example 1 except that no additional aldehyde component is added after completion of the reaction.

TABLE I

| Run | Temp (°F.) | Time | Metal | Inhibitor Concentration (vol. %) | HCl Concentration (wt. %) | Corrosion rate (lb/ft$^2$/day) | | |
|---|---|---|---|---|---|---|---|---|
| | | | | | | Inh. A | Inh. B | Inh. C |
| Ex. 2 | 150 | G | J55 | 0.2 | G | 0.0041 | — | — |
| CE 1 | 150 | G | J55 | 0.2 | G | — | 0.0143 | — |
| Ex. 3 | 375 | 4 | G | 0.2 | G | 0.0615 | — | — |
| CE 2 | 375 | 4 | G | 0.2 | G | — | 0.4442 | — |
| Ex. 4 | 150 | G | J55 | 0.2 | 28 | 0.0056 | — | — |
| CE 3 | 150 | G | J55 | 0.2 | 28 | — | 0.5275 | — |
| Ex. 5[1] | 250 | 4 | G | 0.2 | 28 | 0.0228 | — | — |
| CE 4[1] | 250 | 4 | G | 0.2 | 28 | — | 0.2625 | — |
| Ex. 6[2] | 150 | G | J55 | 0.2 | G | 0.0088 | — | — |
| CE 5[2] | 150 | G | J55 | 0.2 | G | — | 0.0404 | — |
| Ex. 7[3] | 150 | G | J55 | 0.2 | G | 0.0128 | — | — |
| CE 6[3] | 150 | G | J55 | 0.2 | G | — | 0.1101 | — |
| Ex. 8[4] | 150 | G | J55 | 0.2 | G | 0.0067 | — | — |
| CE 7[4] | 150 | G | J55 | 0.2 | G | — | — | 0.0110 |
| Ex. 9[4] | 250 | 4 | G | 1.0 | G | 0.027 | — | — |
| CE 8[4] | 250 | 4 | G | 1.0 | G | — | — | 0.0440 |

[1]The formulations of Example 5 and Comparative Experiment 4 include 1 percent by volume of formic acid.
[2]The formulations of Example 6 and Comparative Experiment 5 include 0.2 volume percent of a surface tension reducer which is an 80 volume percent aqueous solution of an adduct of di-secondary-butyl phenol and 10 moles of ethylene oxide.
[3]The formulations of Example 7 and Comparative Experiment 6 include 0.2 volume percent of demulsifier which is formulated of the following (in volume percent): 30 percent methanol, 50 percent dodecyl benzene sulfonic acid, and 20 percent of an adduct of nonyl phenol and 15 moles of ethylene oxide.
[4]The formulation of Examples 8 and 9 and Comparative Experiments 7 and 8 include 0.48 g of FeS/100 ml of test acid solution.

Thus, it may be seen from the results listed in the preceding table that the inhibitor of Example 1 performs better than Inhibitor B under a wide variety of conditions, and that the inhibitor of Example 1 performs very well in the presence of additives compared to Inhibitor B. Further, it is seen that the additional formaldehyde component of the inhibitor of Example 1 gives improved protection as compared to a similar formulation having no additional formaldehyde component, Inhibitor C.

We claim:

1. A corrosion inhibitor composition comprising:
   (A) The product of the reaction of
   (1) cyclohexylamine or an inertly-substituted derivative thereof, a salt of either of these, or mixtures thereof, with
   (2) per mole of component (1), greater than about 10 moles of formaldehyde or an amount of paraformaldehyde which is sufficient to release greater than about 10 moles of formaldehyde, or a mixture thereof, and
   (3) acetophenone, an inertly-substituted derivative thereof, or a mixture thereof, in an amount which is from about 3 moles per mole of component (A) (1) to an amount which is about equimolar to component (A) (2), and
   (4) from zero to about 10 weight percent, based on the sum of the weights of components (A) (1), (A) (2) and (A) (3), of at least one aliphatic carboxylic acid having from 1 to about 20 carbon atoms; and
   (B) a combination of
   (1) at least one acetylenic alcohol, and
   (2) additional, unreacted formaldehyde.

2. A composition of claim 1 further comprising a $C_1$–$C_4$ alkanol.

3. A composition of claim 2 further comprising a nonionic surfactant.

4. A composition of claim 1 further comprising a nonionic surfactant.

5. A composition of claim 1 wherein component (A) (1) is cyclohexylamine, component (A) (2) is paraformaldehyde, and component (A) (3) is acetophenone.

6. A composition of claim 5 wherein the aliphatic carboxylic acid is tall oil.

7. A composition of claim 1 wherein component (A) is produced in the presence of an acid catalyst.

8. A composition of claim 1 wherein component (A) is produced at a reaction temperature of from about 150° F. to about 250° F.

9. A composition of claim 1 wherein the amount of aliphatic carboxylic acid is zero.

10. A composition of claim 1 wherein from about 11 to about 15 moles of component (A) (2) are employed per mole of component (A) (1).

11. A composition of claim 1 wherein from about 4 to about 8 moles of component (A) (3) are employed per mole of component (A) (1).

12. A composition of claim 1 wherein the amount of free formaldehyde is at least about 4 weight percent of the composition.

13. A composition of claim 1 wherein the amount of acetylenic alcohol is from about 1 to about 30 volume percent of the composition.

14. A composition of claim 1 wherein the amount of free formaldehyde is from about 5 to about 20 weight percent of the composition.

15. A composition of claim 1 comprising:
(A) the product of the reaction of
  (1) cyclohexylamine, a salt thereof, or mixtures thereof,
  (2) per mole of component (A) (1), an amount of paraformaldehyde which is sufficient to release from about 11 to about 15 moles of formaldehyde,
  (3) per mole of component (A) (1), from about 4 to about 8 moles of acetophenone, and
  (4) based on the sum of the weights of components (A) (1-3), from about zero to about 2 weight percent of an aliphatic carboxylic acid or a mixture of aliphatic carboxylic acids; and
(B) a combination of
  (1) an amount of acetylenic alcohol which is from about 5 to about 15 volume percent of the composition,
  (2) an additional formaldehyde component in an amount which will make the composition have at least about 4 weight percent free formaldehyde,
  (3) an amount of a $C_1$-$C_4$ alkanol which is from about 5 to about 50 volume percent of the composition, and
  (4) an amount of a nonionic surfactant which is from about 3 to about 25 volume percent of the composition.

16. A composition of claim 15 comprising:
(A) the product of the reaction, in the presence of a catalytic amount of an acid catalyst at a temperature of from about 150° F. to about 250° F., of
  (1) cyclohexylamine,
  (2) per mole of cyclohexylamine, an amount of paraformaldehyde which is sufficient to produce from about 12 to about 13 moles of formaldehyde,
  (3) per mole of cyclohexylamine, from about 5 to about 6 moles of acetophenone, and
  (4) tall oil as the aliphatic carboxylic acid; and
(B) a combination
  (1) an amount of ethyl octynol which is from about 5 to about 15 volume percent of the composition,
  (2) an additional formaldehyde component in an amount which will make the composition have from about 5 to about 20 weight percent free formaldehyde,
  (3) an amount of isopropanol which is from about 10 to about 15 volume percent of the composition, and
  (4) an amount of a nonionic surfactant which is from about 10 to about 15 volume percent of the composition.

17. An inhibited acid composition comprising an aqueous inorganic non-oxidizing acid, and a corrosion-inhibiting amount of a composition of claim 1.

18. An inhibited acid of claim 17 wherein the composition of claim 1 is from about 0.1 to about 2.0 volume percent of the composition.

19. In a method of treating a subterranean formation penetrated by a wellbore by injecting an acid through the wellbore and into said formation, the improvement comprising employing as the acid a composition of claim 17.

20. A method of claim 19 for acidizing oil or natural gas wells to enhance the production of formation fluids.

21. A method of claim 20 for acidizing sour oil or sour gas wells comprising employing as the acid the composition of claim 18.

* * * * *